United States Patent [19]

Dabringhaus et al.

[11] Patent Number: 4,676,544
[45] Date of Patent: Jun. 30, 1987

[54] TILTABLE ASHTRAY SUITABLE FOR AUTOMOTIVE VEHICLES

[75] Inventors: Volker Dabringhaus; Günter Dietz; Peter Wegel, all of Wuppertal, Fed. Rep. of Germany; H. David Bowman, Priors Hardwick Warwickshire, England; Jürgen Körber, Sindelfingen; Horst Seidl, Böblingen, both of Fed. Rep. of Germany

[73] Assignee: Gebr. Happich GmbH, Fed. Rep. of Germany

[21] Appl. No.: 738,046

[22] Filed: May 24, 1985

[30] Foreign Application Priority Data

May 29, 1984 [DE] Fed. Rep. of Germany ....... 3419982

[51] Int. Cl.$^4$ .......................... A24F 19/06; B60N 3/08
[52] U.S. Cl. ................................. 296/37.9; 296/37.12; 131/231
[58] Field of Search .............................. 296/37.9, 37.12; 131/231; 224/278

[56] References Cited

U.S. PATENT DOCUMENTS

| | | | |
|---|---|---|---|
| 2,174,244 | 9/1939 | Jacobs | 296/37.9 X |
| 2,301,715 | 11/1942 | Springer | 296/37.9 X |
| 2,330,417 | 9/1943 | Gillisse et al. | 296/37.9 X |
| 2,771,209 | 11/1956 | Flynn | 296/37.9 X |
| 3,332,541 | 7/1967 | Corbin | 296/37.9 |

FOREIGN PATENT DOCUMENTS

| | | |
|---|---|---|
| 1232778 | 1/1967 | Fed. Rep. of Germany . |
| 7025722 | 7/1970 | Fed. Rep. of Germany . |
| 2157661 | 5/1973 | Fed. Rep. of Germany . |
| 2105032 | 6/1973 | Fed. Rep. of Germany . |
| 2030478 | 11/1973 | Fed. Rep. of Germany . |
| 2902984 | 4/1980 | Fed. Rep. of Germany ...... 131/231 |

Primary Examiner—Robert B. Reeves
Assistant Examiner—Russell D. Stormer
Attorney, Agent, or Firm—Ostrolenk, Faber, Gerb & Soffen

[57] ABSTRACT

An ashtray, particularly for automotive vehicles, includes a receiving frame which can be fastened in a wall recess, a receiving housing pivotably connected to the frame, and an ashtray insert removably arranged in the housing. The ashtray insert is mounted in the receiving housing in such a manner that it can be lifted toward an opening between the frame and the housing by an actuating element such as a spring-steel strip. A detent spring includes a detent projection which releasably holds the insert within the housing and a deceleration projection which prevents the insert from being ejected when it is released.

11 Claims, 5 Drawing Figures

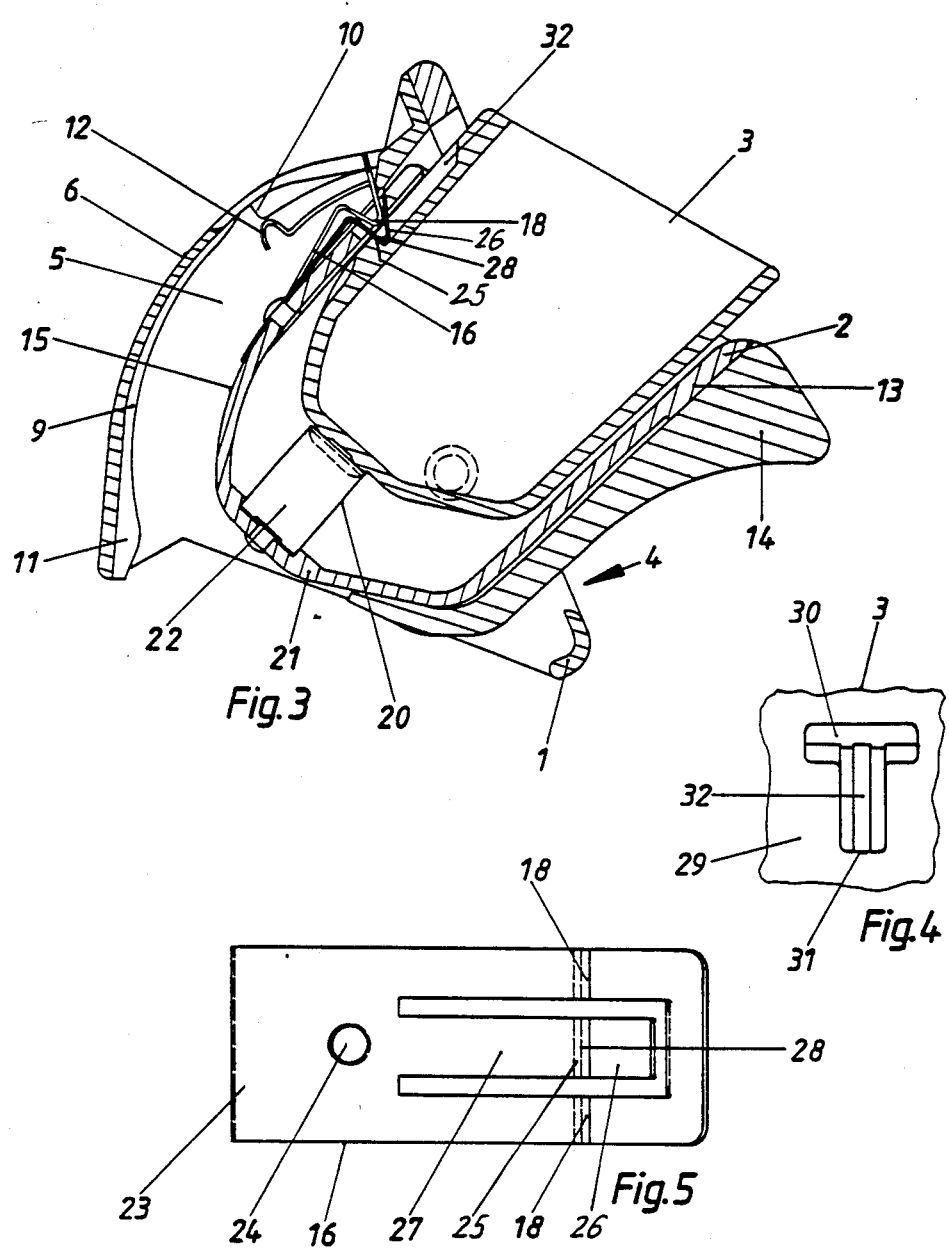

TILTABLE ASHTRAY SUITABLE FOR AUTOMOTIVE VEHICLES

BACKGROUND OF THE INVENTION

The present invention relates to a tiltable ashtray suitable for automotive vehicles, and, more particularly, to such an ashtray which includes a receiving frame which can be fastened in a recess in a wall, a receiving housing which is pivotably connected to said frame, and an ashtray insert which is removably arranged in said housing.

A tiltable ashtray of the above type has been described in German Provisional Patent DE-AS 2 030 478. In that known ashtray, grooves or projections are developed on the inner side of the side walls of the receiving housing for the secure attachment and guidance of the ashtray insert. Such grooves or projections, however, make it difficult, particularly in the dark, to insert the ashtray insert into the receiving housing since the insertion can be effected only with visual inspection.

In the known ashtray, moreover, not only the insertion but also the removal of the ashtray insert from the receiving housing, as is frequently necessary for emptying, are difficult because one must overcome the resistance afforded by a bead which grips the upper edge region of the ashtray insert and is intended to prevent the ashtray insert from clattering. The resistance formed by the bead can be overcome, as indicated in column 2, second paragraph of said patent, if the ashtray insert is grasped on the burning-tip stripper provided thereon and pulled upward. Because this necessarily dirties the fingers of the hand of the person who removes the ashtray insert, this proposal probably will not be generally accepted. The second possibility indicated in the patent, namely to grip the ashtray insert on its side walls, is unsuitable because of the unfavorable lever action with respect to the bead and also because the cutouts necessary for this purpose generally cannot be made in the receiving housing, for reasons of space and stability.

SUMMARY OF THE INVENTION

One object of the present invention is to facilitate and simplify the removal of the ashtray insert from the receiving housing in a simple, inexpensive way, in contrast to the tiltable ashtray described above. Another object is to permit removal of the ashtray insert without dirtying one's fingers.

This object is achieved in accordance with the invention by mounting the ashtray insert in the receiving housing so that it can be lifted toward the opening between the frame and the housing by an actuating element. The actuating element may consist of a lever which engages between the ashtray insert and the housing or of a spring which engages between the ashtray insert and the housing, it being furthermore advisable for the ashtray insert to be so mounted that it can be lifted in the receiving housing by the actuating element after a catch mechanism has been released. The ashtray insert is preferably, on the one hand, acted on within the receiving housing by an ejection spring which serves as actuating element and, on the other hand, held therein by a catch mechanism including a detent which can be provided with an actuating knob for release and which preferably consists of a detent spring.

One principal advantage of the invention resides in the fact that the ashtray insert, which is mounted in the receiving housing in such a manner that it can be lifted by the actuating element, can be removed from the receiving housing without the risk of dirtying one's fingers. Another advantage of the invention is that the ashtray insert is held in a spring-resilient and, thus, chatter-free manner in the receiving housing. The spring-resilient mounting furthermore makes it possible to dispense with guide grooves or projections, so that the ashtray insert can be inserted into the opening provided for it in the receiving housing without visual inspection. The insertion of the ashtray insert is then effected in opposition to the force of the ejection spring, which, however, can easily be overcome by hand. When insertion is completed, the detent spring which secures the position of the ashtray insert automatically engages. The engagement of the detent spring places the ejection spring in operation. The spring characteristic of the ejection spring advantageously produces such a high lifting of the ashtray insert that the insert is in a position which is favorable for the grasping thereof and can easily be grasped by hand and pulled completely out of the receiving housing for emptying. In this connection, it is particularly advantageous if an actuating knob which responds to push or pull is provided for disengaging the detent spring, making it unnecessary to grasp the detent spring so that the detent spring can be arranged in such a manner that it cannot be seen.

In a further advantageous embodiment of the invention, the detent spring has at least one detent projection which holds the ashtray insert detachably in the receiving housing and at least one deceleration projection which prevents the ashtray insert from being ejected out of the receiving housing upon the disengagement of the detent projection. This produces the advantage that a precise selection of the spring force of the ejection spring is unnecessary since an abrupt ejection of the ashtray insert out of the receiving housing with the resulting disadvantageous consequences can be prevented by the deceleration projection even if the spring force is substantially greater than necessary. This is also important in view of the fact that the spring force of the ejection spring must in any event be sufficiently large that a completely full ashtray insert is still lifted into a position favorable for gripping so that the spring force of the ejection spring will always be too great if the ashtray insert is only partly full.

As a further aspect of the invention, the detent spring, which is formed from a strip of spring steel, is fastened to the outside of the housing wall of the receiving housing which faces the receiving frame. A V-shaped bend at the free end region of the detent spring serves as detent projection passing through a recess on the upper end of the housing wall and engaging against the rear wall of the ashtray insert, said wall having a notch for engaging the detent projection. This detent spring is simple and inexpensive to manufacture and can be arranged to be protected from all damage as well as from dirt which might interfere with its operation.

Furthermore, the detent spring, which comprises an attachment tab and a detent projection extending from the tab and having two arms forming a V-shape, preferably has a spring tongue which is cut free on its three sides from the detent projection. The base of the spring tongue is on the attachment tab while its free end region has a bend forming a deceleration projection with the same V-shape as the detent projection. The detent projection and the deceleration projection may be simultaneously produced by two bends with the deceleration projection lying protected in a central cutout in the detent projection, the cutout being formed by cutting out the spring tongue.

Another particularly advantageous aspect of the invention is that the detent spring is attached to the receiving housing in such a manner that the free end region of the free arm of the detent projection comes to rest against the receiving frame in the tilted open position of the receiving housing. The detent projection can then be removed from the notch by a tilting movement of the receiving housing which continues slightly beyond the open position and takes place against the force of the detent spring. The ashtray of the invention, or the receiving housing for it, can be tilted in the customary manner into the closed and open positions and, thus, may also be used in the customary manner. The ashtray of the invention differs, however, from the ashtrays of the prior art in that the open position of the receiving housing is implemented by a spring-resilient top which permits movement past the detent position.

If now, in the practical use of the ashtray, the receiving housing is tilted into the open position and it is found that the ashtray insert must be emptied, it is merely necessary to tilt the receiving housing a few degrees further against the force of the detent spring. As a result of this further tilting, the detent projection is lifted out of the notch, which moves away from it, and the force of the ejection spring can thus act unimpeded on the ashtray insert and lift it up into a favorable position for gripping. The disengagement of the detent projection has no effect on the deceleration projection, which reamins in its position. Rather, the deceleration projection remains resting against the ashtray insert so as to be able to accomplish its function. In this connection, however, it is advantageous if, in accordance with a further embodiment of the invention, the notch provided in the rear wall of the ashtray insert has in its central region (which serves to receive the deceleration projection) a downward-extending groove which is limited by a stop. In this way, after disengagement of the detent spring, the ashtray insert will not be moved abruptly upward by the ejection spring but rather the emergence of the upper end region of the ashtray insert from the receiving housing will be decelerated by the deceleration projection and furthermore limited by the stop which comes against the deceleration projection. There is thus no possibility of the ashtray insert being ejected completely out of the receiving housing and its contents falling into the car.

By arranging the detent spring in accordance with the invention, said spring is capable of simultaneously performing a plurality of functions, namely to hold the ashtray insert in a retracted position, to release it, to decelerate it and then hold it again in a given lifted position, and furthermore to serve as a stop of the receiving housing in the open position and as return guide into the open position of the receiving housing which has been moved passed the detent.

To implement the ejection spring, a coil spring or a lever, for example, can be used. However, it is preferable for the ejection spring to consist of a length of spring-steel strip which is fastened to the bottom wall of the receiving housing and has obliquely-upward bent end regions which form spring arms. Such an ejection spring is simple and economical to manufacture while being sturdy in use.

Other objects, features and advantages of the invention will be apparent from the following description, together with the accompanying drawings and the appended claims.

BRIEF DESCRIPTION OF THE DRAWINGS

The invention will be explained in further detail below with reference to an embodiment shown in the drawings, in which:

FIG. 3 is a section along the line II—II of FIG. 1 with the ashtray open;

FIG. 4 is a partial view of the rear of the ashtray insert; and

FIG. 5 shows the detent spring on a substantially larger scale.

DETAILED DESCRIPTION OF THE PREFERRED EMBODIMENTS

Figure 1:
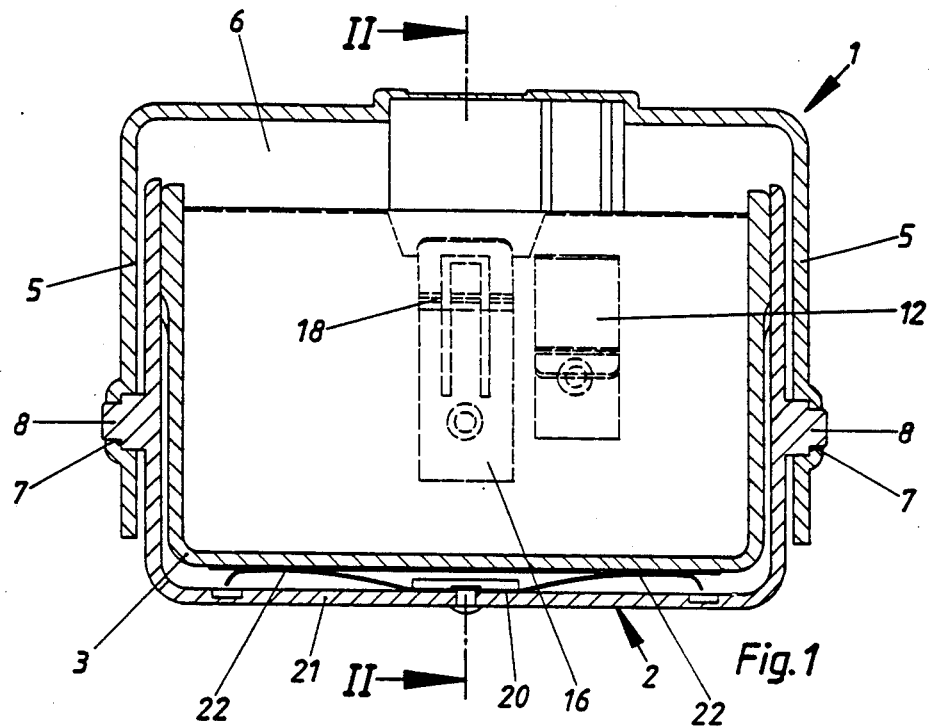
FIG. 1 is a longitudinal section through the tiltable ashtray, approximately along the line I—I in FIG. 2.

The new tiltable ashtray consists of a receiving frame 1, a receiving housing 2 which is pivotably connected therewith, and an ashtray insert 3 arranged removably in said housing.

The receiving frame 1 has a front opening 4 which permits the mounting of the receiving housing 2 and a tiltable support thereof. The receiving frame 1, which is suitably formed as a plastic injection molding, furthermore has side members 5 and a top wall 6 which has an arcuate configuration. The side members 5 contain bearing holes 7 into which extend journal pins 8 formed on the receiving housing 2, which also preferably consists of a plastic injection molding.

The side of the top wall 6 which faces the receiving housing 2 has a guide path 9 which is delimited at one end by a stop 10 and at the other end by a projection 11. The guide path 9 serves for the sliding application of a detent spring 12 which is fastened to the receiving housing 2. The receiving housing 2 together with the ashtray insert 3 is held free of chatter by the detent spring 12 in the open and closed positions as well as in intermediate positions.

The receiving housing 2 is of cup shape. On its side walls it has the aforementioned journal pins 8, on its front wall 13 is a front plate 14 which satisfies aesthetic requirements; and on its rear wall 15, in addition to the detent spring 12 which has already been mentioned, is another detent spring 16 which serves to hold the ashtray insert 3. The detent spring 16 which is fastened, for example, by means of a rivet 17 to the wall 15 has a V-shaped detent projection 18, formed by a double bend, which passes through a recess 19 provided in the wall 15 and extends into the space of the opening of the receiving housing 2. The receiving housing 2 is furthermore provided with a so-called ejector spring 20 which consists of a length of spring-steel strip which is attached to the bottom wall 21 and has obliquely raised end regions which form spring arms 22. Ejector spring 20 thus serves as a lever engaging receiving housing 2 and ashtray insert 3.

The detent spring 16 (see also FIG. 5) has an attachment tab 23 having a hole 24 for the rivet 17, a detent projection 18 which comprises two arms 25 and 26, and furthermore a spring tongue 27 which is cut free from detent projection 18 on three of its sides. The base of spring tongue 27 is located in the attachment tab 23 and its free end region has a V-shaped bend which has the same shape as the detent projection 18 and serves as deceleration projection 28. The detent projection 18 is interrupted in its central area by the cutout forming the deceleration projection 28.

Figure 2:
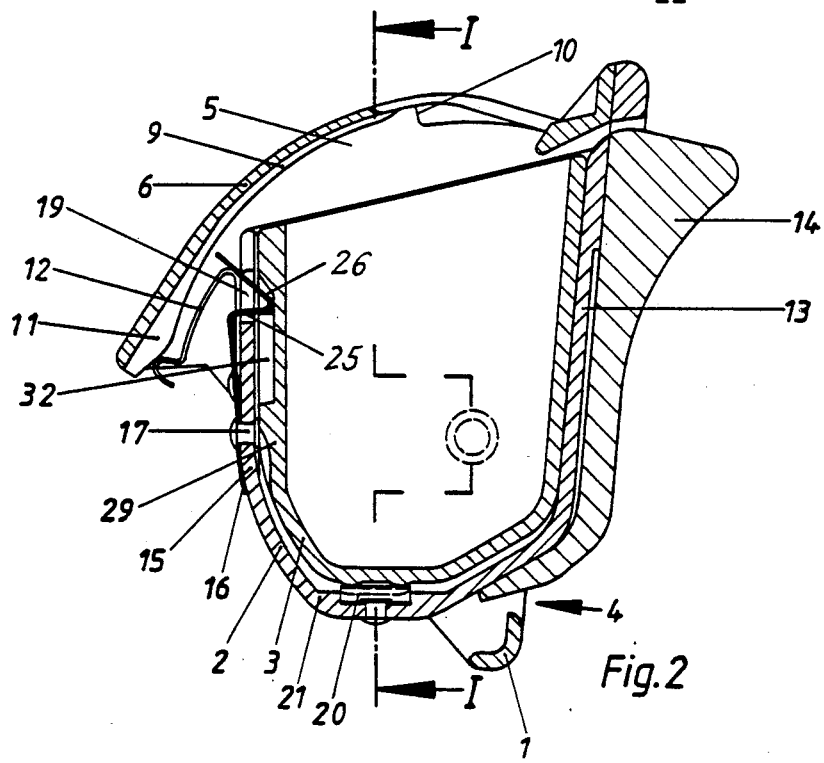
FIG. 2 is a cross-section along the line II—II of FIG. 1 with the ashtray closed.

The ashtray insert 3 (FIGS. 1 and 2) has a cup shape which is adapted to fit within the receiving frame of the receiving housing 2 and is formed of sheet metal or of heat-resistant plastic. A special feature of the ashtray insert 3 is that its rear portion 29 has a notch 30 (see FIG. 4) which extends parallel to the pivot pin and serves for the engagement of the detent projection 18 as well as for the engagement of the deceleration projection 28. The notch 30 passes in its central region, which serves to receive the deceleration projection 28, into a downward directed groove 32 which is limited by a stop 31.

In assembling the ashtray, the receiving housing 2 is first provided with the detent springs 12 and 16 and with the ejector spring 20, and the receiving housing 2 is then inserted into the receiving frame 1. By then inserting the ashtray insert 3, this built-in unit is completed. The mounting of the ashtray in a wall recess (not shown) is effected in a traditional manner.

The operation of the new tiltable ashtray is as follows: The receiving housing 2 is pivotably connected to the receiving frame 1 by the journal pins 8 which are mounted for rotation in the bearing holes 7. It can therefore be tilted out of the closed position shown in FIG. 2 into the open position shown in FIG. 3, with FIG. 3 also showing the installed position of the new tiltable ashtray. When the receiving housing 2 together with the ashtray insert 3 is brought into the open or closed position, the slide projection formed on the free end of the detent spring 12 slides over the guide path 9 and after passing beyond the projection 11, defines the closed position of the ashtray, while when it rests against the stop 10 it defines the open position thereof. In the open position, the ashtray insert 3 can now be removed and reinserted. Upon the insertion of the ashtray insert 3, the detent projection 18, which moves back against the spring force, and the deceleration projection 28, slide over the rear 29 of the ashtray insert 3 until reaching one central region of the notch 30 into which the detent projection 18 engages and thus holds the ashtray insert 3 in the receiving housing 2 against the force of the ejector spring 20, which is cocked by the insertion. The engagement of the deceleration projection 28 into the downward-extending groove 32 takes place correspondingly earlier.

For the removal of the ashtray insert 3, the receiving housing 2 is merely moved slightly beyond the engagement point, i.e. tilted somewhat further into its open position than is defined by the stop 10. The slide projection of the detent spring 12 is pulled over the stop 10 as shown in FIG. 3. The free end region or actuating knob of the arm 26 of the detent spring 16 is pulled against the inner side of the receiving frame 1 and blocked there, with the result that the detent nose 18 releases the notch 30. In this way, the energy of the ejector spring 20 is liberated and the ashtray insert 3 is pushed up with a speed which is decelerated by the deceleration projection 28, which remains in frictional contact with the ashtray insert 3. The stroke is furthermore limited by the stop 31. The ashtray insert, which is thus lifted, can now be easily grasped by hand and pulled completely out of the receiving housing 2.

Since the movement of the receiving housing 2 beyond the detent point at its open position takes place against the force of the detent spring 16, it can be understood that the force of the detent spring 16 is also sufficiently great to return the receiving housing 2 automatically into the position which it occupied prior to the movement beyond the detent point. The position of the receiving housing 2 beyond the detent point is shown in FIG. 3. In the normally open position, the slide projection of the detent spring 12 rests against the stop 10.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A tiltable ashtray suitable for automotive vehicles, comprising:
   a receiving frame;
   a receiving housing connected with the frame and pivotable to an open position in which the frame and the housing define an opening;
   an ashtray insert removably arranged in the housing;
   first spring means for lifting the ashtray insert relative to the receiving housing; the ashtray insert being supported in the receiving housing in such a manner that it can be lifted toward the opening by the actuating element to facilitate removal from the housing;
   second spring means for releasably retaining the ashtray insert in the housing; and
   third spring means mounted on the housing which rests against the frame when the housing is in a tilted open position.

2. A tiltable ashtray according to claim 1, wherein, the first spring means comprises an ejector spring for urging the ashtray insert toward the opening and the second spring means comprises a detent for holding the ashtray insert in the inserted position.

3. A tiltable ashtray according to claim 2, wherein the second spring means further comprises an actuating knob for disengaging the detent from the ashtray insert.

4. A tiltable ashtray according to claim 1, wherein the second spring means comprises a detent spring.

5. A tiltable ashtray according to claim 4, wherein the detent spring has at least one detent projection for releasably holding the ashtray insert in the inserted position and at least one deceleration projection for preventing the ejection of the ashtray insert out of the receiving housing upon release of the detent projection.

6. A tiltable ashtray suitable for automotive vehicles, comprising:
   a receiving frame;
   a receiving housing connected with the frame and pivotable to an open position in which the frame and the housing define an opening;
   an ashtray insert removably arranged in the housing;
   an actuating element for lifting the ashtray insert relative to the receiving housing; the ashtray insert being supported in the receiving housing in such a manner that it can be lifted toward the opening by the actuating element to facilitate removal from the housing;
   the ashtray insert being mounted on the receiving housing in such a manner that it can be lifted by the actuating element from an inserted position within the receiving housing toward the opening, the ashtray further comprising a catch mechanism for releasing the ashtray insert to be lifted from the inserted position toward the opening; wherein the actuating element comprises an ejector spring for urging the ashtray insert toward the opening, the catch mechanism comprising a detent for holding the ashtray insert in the inserted position; the detent comprising a detent spring;

the detent spring having at least one detent projection for releasably holding the ashtray insert in the inserted position and at least one deceleration projection for preventing the ejection of the ashtray insert out of the receiving housing upon release of the detent projection;

the detent spring comprising a length of spring-steel strip having a free end region with a V-shaped bend serving as the detent projection, the receiving housing having a wall with an outer side facing the frame, a recess being defined in the wall, the detent spring being fastened to the outer side of the wall with the V-shaped bend passing through the recess and engaging against the ashtray insert, the ashtray insert having a notch defined therein for receiving the detent projection where it engages the insert.

7. A tiltable ashtray according to claim 6, wherein the detent spring further comprises an attachment tab opposite the free end region, the steel strip extending from the tab and having a central area, the detent spring further comprising a spring tongue formed by a cutout in the central area of the steel strip and having a base connected to the tab and an opposite free end region with a deceleration projection, the deceleration projection being a V-shaped bend of the same shape as the detent projection.

8. A tiltable ashtray according to claim 7, wherein the detent projection comprises a free arm with a free end region and the detent spring is so attached to the receiving housing that the free end region of the free arm of the detent projection comes to rest against the receiving frame when the receiving housing is pivoted into the open position; the detent projection being liftable out of the notch in the ashtray insert by a pivoting movement of the receiving housing in opposition to the detent spring which continues slightly beyond the open position.

9. A tiltable ashtray according to claim 8, wherein the notch in the insert has a central region, the central region receiving the deceleration projection, the notch further having a downward-extending groove, the insert having a stop limiting the downward-extending groove.

10. A tiltable ashtray according to claim 9, wherein the receiving housing has a bottom wall, the ejector spring comprising a length of spring-steel strip fastened to the bottom wall of the receiving housing and having obliquely erect end regions forming spring arms.

11. A tilting ashtray for use in a vehicle, a frame securable in said vehicle; a housing hingedly mounted in said frame for movement from a closed position to an open position;
- an ashtray insert removably mounted in said housing;
- an ejecting spring in said housing bearing against said ashtray insert;
- a detent spring at the front of the housing for maintaining said ashtray insert in said housing against the force of said ejecting spring;
- a stop being mounted on said housing and comprising a spring which rests against said frame when the housing is in a tilted open position;
- said housing being hingedly movable beyond the stop position against the bias of the stop spring to a further full open position;
- said insert being capable of being lifted out of the housing when the housing is in full open position.

* * * * *